United States Patent
Williams et al.

(10) Patent No.: US 6,976,128 B1
(45) Date of Patent: Dec. 13, 2005

(54) CACHE FLUSH SYSTEM AND METHOD

(75) Inventors: James A. Williams, Mahtomedi, MN (US); Robert H. Andrighetti, Somerset, WI (US); Conrad S. Shimada, Oakdale, MN (US); Donald C. Englin, Shoreview, MN (US)

(73) Assignee: Unisys Corporation, Blue Bell, PA (US)

( * ) Notice: Subject to any disclaimer, the term of this patent is extended or adjusted under 35 U.S.C. 154(b) by 281 days.

(21) Appl. No.: 10/255,420

(22) Filed: Sep. 26, 2002

(51) Int. Cl.[7] ............................................. G06F 12/00
(52) U.S. Cl. ........................................ 711/135; 711/141
(58) Field of Search ........................ 711/113, 118, 130, 711/135, 141–146

(56) References Cited

U.S. PATENT DOCUMENTS

| | | | | |
|---|---|---|---|---|
| 5,230,045 A | * | 7/1993 | Sindhu | 711/203 |
| 5,278,964 A | * | 1/1994 | Mathews et al. | 711/3 |
| 5,845,325 A | * | 12/1998 | Loo et al. | 711/135 |
| 5,845,326 A | * | 12/1998 | Hirayama et al. | 711/135 |
| 6,088,773 A | * | 7/2000 | Kano et al. | 711/161 |
| 6,115,791 A | * | 9/2000 | Collins et al. | 711/122 |
| 6,230,241 B1 | * | 5/2001 | McKenney | 711/118 |
| 6,378,047 B1 | * | 4/2002 | Meyer | 711/135 |
| 6,381,674 B2 | * | 4/2002 | DeKoning et al. | 711/113 |
| 6,546,462 B1 | * | 4/2003 | Palanca et al. | 711/135 |
| 6,601,153 B1 | * | 7/2003 | Engelbrecht et al. | 711/166 |
| 6,631,447 B1 | * | 10/2003 | Morioka et al. | 711/141 |
| 6,658,532 B1 | * | 12/2003 | Horrigan et al. | 711/135 |
| 6,681,297 B2 | * | 1/2004 | Chauvel et al. | 711/130 |
| 6,750,870 B2 | * | 6/2004 | Olarig | 345/531 |
| 6,760,817 B2 | * | 7/2004 | Arimilli et al. | 711/137 |

* cited by examiner

*Primary Examiner*—Nasser Moazzami
(74) *Attorney, Agent, or Firm*—Beth L. McMahon; Charles A. Johnson; Mark T. Starr

(57) ABSTRACT

A system and method is provided to selectively flush data from cache memory to a main memory irrespective of the replacement algorithm that is used to manage the cache data. According to one aspect of the invention, novel "page flush" and "cache line flush" instructions are provided to flush a page and a cache line of memory data, respectively, from a cache to a main memory. In one embodiment, these instructions are included within the hardware instruction set of an Instruction Processor (IP). According to another aspect of the invention, flush operations are initiated using a background interface that interconnects the IP with its associated cache memory. A primary interface that also interconnects the IP to the cache memory is used to simultaneously issue higher-priority requests so that processor throughput is increased.

46 Claims, 5 Drawing Sheets

CACHE FLUSH SYSTEM AND METHOD

RELATED APPLICATIONS

The following co-pending applications of common assignee have some subject matter in common with the current application:

"System and Method for Initializing Memory Within a Data Processing System", Ser. No. 10/255,495 filed on even date herewith.

FIELD OF THE INVENTION

This invention relates generally to data processing systems, and more particularly to an improved system and method for flushing cache memory within a large-scale data processing system.

BACKGROUND OF THE INVENTION

Many data processing systems today require the use of at least one cache. A cache memory is a relative fast memory located close to a requester to store data in order to reduce the number of accesses required to a main memory. The processor then uses and manipulates the data in the cache rather than main memory.

In data processing systems in which multiple resources may access and manipulate the data in main memory, it is important to keep coherency between the various resources. Data coherency involves ensuring that every processor within the system accesses the same, latest copy of the data. To ensure the every processor uses the same copy of data, data that has been updated within a processor's cache must periodically be flushed to main memory as new data is stored within the cache memory.

Most cache systems employ a cache replacement algorithm to determine which data will be flushed from cache to make room as new data is stored into the cache. Many replacement algorithms are available, including a least recently used (LRU) algorithm that tracks how recently each cached unit of data is accessed. Variations include a Least Frequently Used (LFU) algorithm, or some combination of the LRU and LFU algorithms. These algorithms generally operate on a cacheable unit of data as defined by the organization of the cache. For example, in a current embodiment that uses a set associative cache, tracking is done on the cache lines included within the same set.

Replacement algorithms are designed to ensure that data that is currently in use or that has been recently accessed is not flushed to main memory. The replacement algorithms are therefore primarily designed to prevent disruption of a processor that has already cached data. The replacement algorithms do not take into consideration, however, the requirements of other processors within the system. For example, data that is used even periodically by a processor may remain within that processor's cache, even if that data is likely to be needed by another processor within the system.

What is needed, therefore, is an improved system and method for selectively flushing data from cache to a main memory under processor control. The mechanism overrides the replacement algorithm that is employed by the system.

SUMMARY OF THE INVENTION

The current invention provides a way to selectively flush data from cache to a main memory in a manner that overrides the replacement algorithm being used to manage the cache data. According to one aspect of the invention, novel "page flush" and "cache line flush" instructions are provided to flush a page and a cache line, respectively, from a cache memory to a main memory. In one embodiment, a page includes 4096 bytes, and a cache line includes 128 bytes, of memory, although other page and cache line sizes may be utilized. In another embodiment, other units of memory may be used instead of a page or cache line to perform the flush operation.

The flush instructions may be included within the hardware instruction set of an Instruction Processor (IP). An IP can execute one or more of these instructions to selectively flush data from a processor's cache to a main memory. A flush operation may be performed as soon as cache data is modified and irrespective of the type of cache replacement algorithm that is being used. The flushed data is stored within the main memory, and, generally speaking, may thereafter be retrieved by another IP more quickly than if the data had to be retrieved from a cache memory. It will therefore be appreciated that these instructions may be advantageously incorporated within an instruction stream that causes an IP to modify memory data that may be needed by one or more other IPs in the system within that same time frame.

According to one aspect of the invention, when an IP executes either a page flush or a cache line flush instruction, hardware within the IP is activated to control initiation of the flush operation. In one embodiment, this hardware is a microsequencer that controls presentation of a flush request to a Second-Level Cache (SLC) that is coupled to the IP. After activation of the microsequencer, the IP may begin decoding the next instruction in the instruction stream without waiting for the flush operation to complete. This increases the throughput of the IP.

According to yet another aspect of the invention, multiple flush instructions may be executed within a relatively short time frame to thereby initiate multiple flush operations. If the flush request logic is not available when a given flush instruction is executed by an IP, the flush request is stored within a dedicated queue structure of the IP, and later presented to the SLC under control of the microsequencer. The IP may thereafter continue executing additional instructions in the instruction stream without waiting for the queued flush requests to be completed.

In one embodiment, a flush request presented to an SLC includes a function code to indicate that type of flush operation that is being initiated, and further includes an address identifying the page or cache line of memory that is to be flushed from the cache. In response to receipt of such a request, hardware included in the SLC invalidates the addressed data within the cache, and flushes the data to the main memory via the processor bus coupling the SLC to memory logic.

According to another aspect of the invention, when a page flush operation is initiated, a page of memory is flushed from the SLC in cache line increments, wherein a cache line includes 128 bytes. More specifically, the SLC generates address and function data on the processor bus to flush one cache line at a time. By segmenting a page flush operation in this manner, other higher priority requests are allowed to gain access to the processor bus so that processor throughput is only minimally impacted by the flush operation.

In one embodiment, a cache line of memory is only flushed to memory when the cache line includes modified data. If this is not the case, the flush operation returns only access rights to the main memory, but not data. This conserves bus cycles on the processor bus.

In still another embodiment, a system is provided for use within a data processing system having at least one Instruction Processor (IP) coupled to a cache memory. The system comprises a primary interface coupling the IP to the cache memory to provide read and write requests from the IP to the cache memory, and a background interface coupling the IP to the cache memory to selectively initiate the flushing of data from the cache memory. While flush requests are provided on the background interface, other higher-priority requests may be simultaneously presented to the cache memory on the primary interface.

According to another aspect of the invention, a method of selectively flushing data from a cache memory to a main memory is provided. The method includes executing a flush instruction, and as a result, issuing a flush request to the cache memory to cause data to be flushed from cache memory to the main memory.

In still a different embodiment, a system to flush data from a cache memory to a main memory is disclosed. The system includes processor means for executing a flush instruction, and means for flushing the data from the cache memory in response to execution of the flush instruction by the processor means.

Also disclosed is a system for flushing data to a main memory. The system is adapted for use within a multiprocessor data processing system having a main memory coupled to multiple cache memories, wherein at least one of the cache memories is coupled to an instruction processor. The system includes a decode circuit included within the instruction processor to execute a flush instruction that identifies addressable data stored within the main memory. The system further includes a circuit coupled to the decode circuit to cause all valid copies of the data that may be stored within the multiple cache memories to be flushed to the main memory. The circuit includes circuits to return any updated copy of the data to the main memory, and further includes circuits to invalidate all of the valid copies of the data that may be stored within the multiple cache memories.

Other scopes, aspects, and embodiments of the current invention will become apparent from the following description and the accompanying drawings.

DETAILED DESCRIPTION OF THE DRAWINGS

Figure 1:
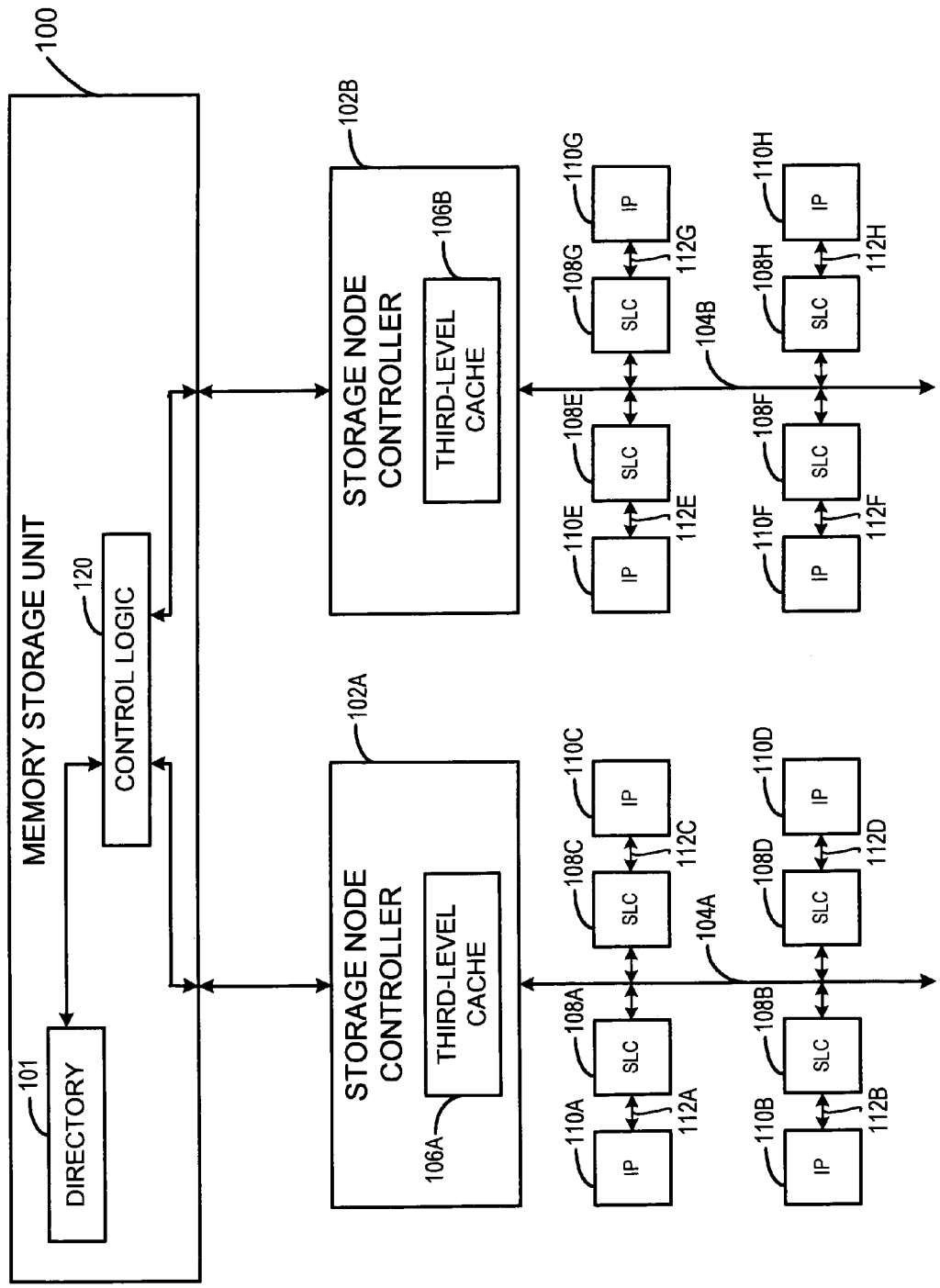
FIG. 1 is a block diagram of an exemplary data processing system of the type that may employ the current invention.

FIG. 1 is a block diagram of an exemplary data processing system as may employ the current invention. The system includes a memory storage unit (MSU) 100 that provides the main memory for the system. MSU 100 may include random access memory (RAM), read-only memory (ROM), and any other type of memory known in the art. MSU 100 may be subdivided into multiple subunits (not shown) in a manner largely beyond the scope of the current invention.

In one embodiment, MSU is a directory-based storage unit similar to the system described in commonly-assigned U.S. patent application Ser. No. 09/001,598 filed Dec. 31, 1997 entitled "Directory Based Cache Coherency System Supporting Multiple Instruction Processor and Input/Output Caches", incorporated herein by reference. In this embodiment, MSU retains information in directory 101 that indicates where the latest copy of requested data resides within the system, as is discussed further below. This is necessary since data from MSU 100 may be copied into any of the various cache memories within the system. Directory 101 tracks the latest copy of the data to ensure that every processor is operating from this copy. In the current embodiment, directory 101 includes a directory entry that tracks the location of each 128-byte block of memory within the MSU, where a 128-byte block is referred to as a "cache line". Other embodiments may utilize cache lines of different sizes.

MSU is coupled to one or more Storage Node Controllers (SNCs) shown as SNCs 102A and 102B. The system of the current invention may include more or fewer SNCs than are shown in FIG. 1. Each SNC is coupled to MSU 100 over one or more high-speed MSU interfaces that each includes data, address, and function lines. For simplicity, each SNC is shown coupled to MSU 100 over a single interface.

Each SNC includes logic to interface to the high-speed MSU interface, and further includes logic to interface to a respective one of processor buses 104A and 104B. These processor buses can be any type of bus protocol. Each SNC further includes a respective cache and all supporting logic. This cache may be a Third-Level Cache (TLC), a Fourth-Level Cache (4LC), or some other type of cache memory. In the embodiment shown, these caches are TLCs 106A and 106B.

As noted above, each of SNCs 102A and 102B is coupled to a respective processor bus 104A and 104B. Each processor bus further couples to multiple local cache memories. In the current embodiment, the local cache memories are shown as Second-Level Caches (SLCs) 108A–108H. In another embodiment, these local caches may be Third-Level Caches.

Each SLC 108 is coupled to a respective one of the Instruction Processors (IPs) 110A–110H over a respective interface 112A–112H. For example, SLC 108A is coupled to IP 110A via interface 112A, SLC 108B is coupled to IP 110B via interface 112B, and so on. The IP may be any type of processor such as a 2200™ processor commercially available from Unisys Corporation, a processor commercially available from Intel Corporation, or any other processor known in the art. Each IP may include one or more on-board caches. In the current embodiment, each IP may include a First-Level Cache (FLC). Preferably, each IP resides on a single Application Specific Integrated Circuit (ASIC) device with a respective SLC 108. Alternatively, an IP may be coupled to a respective SLC over an external interface.

When executing a stream of instructions, an IP such as IP 110A may retrieve instructions and data from MSU 100, or one of the other cache memories in the system. For example, assume IP 110A requires read/write access to a memory address. IP 110A first attempts to retrieve this address from its internal cache(s) such as a FLC. If the cache line that includes the requested address is not resident within the FLC, a request is sent to the respective SLC 108A for that cache line. If the requested cache line is likewise not resident within the SLC, the SLC forwards the request to the coupled SNC 102A via the associated processor bus 104A. In one embodiment of the invention, each SLC implements a bus snoop protocol to monitor the processor bus for such requests. When the request is "snooped" by the SLCs 108B–108D, the SLC will return the data and desired access rights to SLC 108A on processor bus 104A if such a data copy and access rights are retained by that SLC. Similarly, if TLC 106A stores the most recent copy of the cache line, and if the TLC 106A has further been granted the desired access rights to the cache line, the cache line will be returned to the SLC 108A to be forwarded to IP 110A.

In some instances, data requested by an IP is not resident within any of the cache memories associated with processor bus 104A. In that case, SNC 102A forwards the request to MSU 100. MSU 100 determines the location and "state" of the most recent copy of the cache line using state bits stored within its directory 101. In the current embodiment, a cache line may be in one of a number of predetermined states that include, but are not limited to, the following:

MSU Owns;
Exclusive; and
Shared.

MSU Owns State

All cache lines in the MSU are placed in the MSU owns state after system initialization and before any cache lines have been copied into one of the system caches. This state indicates that the MSU has the most recent copy of the cache line. Since only the MSU is considered to have a valid copy of any cache line that is in the MSU owns state, an error occurs if any SNC 102A issues a request to write to a cache line that is in this state.

Exclusive State

An IP 110 may make a request to an MSU 100 via its respective SLC 108 and SNC 102 to obtain a copy of a cache line so data within that cache line may be modified, as is the case in the current example. When MSU 100 provides the SNC with the requested cache line, directory 101 records state information to indicate that the cache line is held by the SNC in the exclusive state. The cache line is stored within the SNC's TLC 106, which is said to be the "owner" of that cache line. The TLC is granted read/write access rights to the cache line. Only one TLC may be the owner of a cache line at once. No other cache may have a copy of the cache line while another TLC is the owner. The SNC further forwards the data to the requesting IP 110 via processor bus 104 and the associated SLC 108. The TLC records which of the SLCs has the cache line in the exclusive state. Only one SLC may have the cache line in this exclusive state.

Once the directory 101 records that a cache line is in the exclusive state, the copy of the cache line stored within the MSU is no longer considered valid. When the MSU receives a request for a cache line that is in this state, the MSU must retrieve the cache line copy from the owner during what is referred to as a "return" operation.

Shared State

A processor may also request a copy of a cache line for read-only purposes. When this type of request is received, a cache line is copied to the requesting SNC 102 for read-only purposes, and the cache line state transitions to the shared state. In this state, the cache line may reside within one, several, or all of the SNCs in the system at once. The MSU is still considered to have a valid copy of the cache, and may provide this cache line to another SNC making a further read-only request. The SNC may, in turn, forward the cache line to any one or more of the SLCs 108 on its processor bus 104. Logic associated with the SNC's TLC 106 records that one or more of the SLCs 108 have a valid copy of the cache line with read-only access rights.

A further discussion describing additional states used by the memory coherency scheme of the current system is provided in the commonly-assigned U.S. patent application entitled "Directory Based Cache Coherency System Supporting Multiple Instruction Processor and Input/Output Caches" referenced above.

Returning to the current example, assume that the state bits of directory 101 indicate that the most current copy of the requested cache line resides either within SNC 102B or within one of the SLCs 108E–108H associated with that SNC. The MSU is therefore not able to provide the cache line directly to SNC 102A, but instead control logic 120 must issue a "return" command to prompt SNC 102B to return the requested data to MSU 100.

Upon receiving the return command, SNC 102B determines, based on retained state bits, whether any of the SLCs 108E–108H have a copy of the data. If not, SNC 102B may return the requested data directly to MSU 100. Otherwise, SNC 102B issues a request to each of the SLCs 108E–108H via bus 104B requesting return of the data. This request is snooped by SLCs 108E–108H such that any of these SLCs having a valid data copy will invalidate that copy, and will further invalidate any copy stored by the associated FLC. If any one of these SLCs had acquired exclusive ownership of, and subsequently modified, the data, that modified copy is returned to SNC 102B during a "write back" operation. SNC 102B then returns this data to MSU 100, and invalidates its copy.

After the requested data is forwarded to MSU 100, MSU provides that data to SNC 102A. MSU further updates directory 101 to record that the cache line is in the exclusive state, and that SNC 102A owns the exclusive copy. SNC 102A provides requested cache line along with the read/write, or "exclusive" access rights to requesting IP 110A via SLC 108A so that execution may continue. IP 110A and SLC 108A are now said to "own" this cache line.

As is apparent from the foregoing discussion, obtaining requested data may be time-consuming. In the foregoing example, IP 110A issues a request for data that is resident in SNC 102B or one of the associated SLCs 108E–108H. This request is fulfilled by transferring the data from SNC 102B to MSU 100. The MSU 100 then forwards the data to SNC 102A, which, in turn, provides the data to SLC 108A. The time required to complete these operations may be significant, especially during times when system interfaces are experiencing significant traffic. The current system and method provides a mechanism to decrease response times by ensuring that data that is likely to be needed by another processor within the system will be resident within the MSU. This will be discussed in detail below.

Before continuing with a detailed description of the invention, the process of flushing data from cache is considered briefly. As discussed above, data may be flushed from a cache memory such as SLC 108A to MSU 100 to make room for additional data within the SLC. In prior art systems, this flushing operation is typically performed using some type of replacement algorithm. That is, when data is received from the MSU to be stored within the SLC, a replacement algorithm determines which resident data will be replaced by the newly retrieved data. If the resident data has been updated, it must be flushed out of the SLC. In the current embodiment, this data is flushed to the respective TLC. For example, data flushed from SLC 108A is flushed to TLC 106A.

Many replacement algorithms are available, including a Least Recently Used (LRU) algorithm that tracks how recently each cached unit of data was accessed. Variations include a Least Frequently Used (LFU) algorithm, or some combination of the LRU and LFU algorithms. These algorithms generally operate on a cacheable unit of data as defined by the organization of the cache. For example, in a current embodiment that uses a set associated cache, tracking is done on the cache lines included within the same set.

Replacement algorithms are designed to ensure that data that is currently in use, or that was recently accessed, by a processor is not flushed to main memory. However, the replacement algorithms do not take into consideration the requirements of other processors within the system. For example, data that is used even periodically by a processor may remain within that processor's cache, even if that data is likely to be needed by another processor within the system. The current invention provides a way to selectively flush data from cache in a manner that overrides the operation of the replacement algorithm being used to manage the cache data. Moreover, the current mechanism ensures that the data is flushed from an SLC 108 back to MSU 100 rather than being flushed only to a TLC 106.

The current invention provides several instructions that are part of the hardware instruction set of the IP. Upon execution of any of these instructions, one or more addressable locations of memory as specified by the instruction are flushed from the processor's SLC to MSU 100. This data is flushed back irrespective of the replacement algorithm used to manage the SLC data. Even recently used data may be flushed back to MSU 100 so that the MSU gains ownership of the data. Generally speaking, this data can thereafter be provided to another IP faster than if the data had remained within the first IP's SLC. Thus, by selectively flushing data that is likely to be needed by another processor within the system, the current invention minimizes latency associated with obtaining that data. This is discussed below in reference to the remaining figures.

Figure 2:
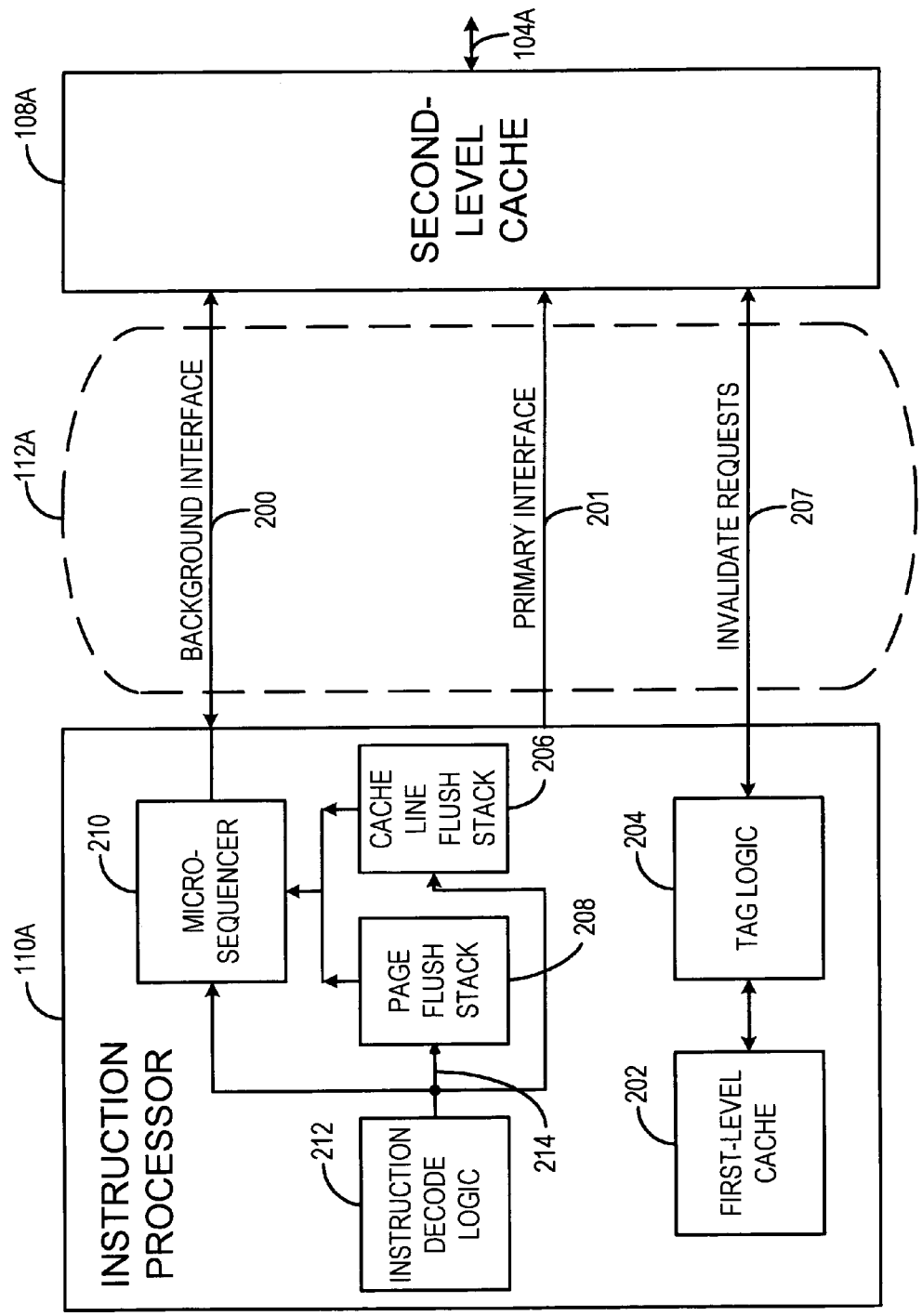
FIG. 2 is a block diagram of an Instruction Processor and Second-Level Cache according to the current invention.

FIG. 2 is a block diagram of IP 110A and SLC 108A, although it applies equally to all other IPs and SLCs in the exemplary data processing system. IP 110A is coupled via interface 112A (shown dashed) to SLC 108A. Interface 112A includes a primary interface 201, that supports data transfers between IP 110A and the SLC 108A for most data read and write operations. In one embodiment, the primary interface consists of an independent instruction read port and an operand port. The operand port, which supports operand read and write requests, includes address and function signals, and independent read and write data paths.

IP 110A includes a First-Level Cache (FLC) 202 coupled to tag logic 204. In the current embodiment, FLC is a store-through, set associative cache that stores both instructions and operands on a cache line basis. The addresses of the cache lines stored within FLC are recorded by tag logic 204. When a cache miss occurs to FLC 203, the requested cache line is retrieved from SLC 108A, or from one of the other memories within the system via primary interface 201. Requests to invalidate a cache line stored within FLC 203 are received from SLC 108A via lines 207 of interface 112A.

According to the current invention, a second BacK-Ground (BKG) interface 200 is provided to perform flush operations and other "background" tasks. BKG interface 200 may initiate these background operations while other read and write operations are occurring on interface 201. In this manner, the completion of higher priority tasks are not delayed by the execution of these lower-priority flush operations. In the current embodiment, the background tasks may further include page zero write operations described in the co-pending application entitled "System and Method for Initializing Memory Within a Data Processing System" referenced above.

FIG. 2 further illustrates several storage devices shown as stacks 206 and 208. In the current embodiment, each of stacks 206 and 208 is capable of storing up to eight addresses, although any other size stack may be selected in the alternative. Stack 206 stores cache line addresses, whereas stack 208 stores page addresses. Stacks 206 and 208 are coupled to a microsequencer 210, which is a control circuit capable of performing simple logic sequences. Microsequencer 210 controls providing addresses from one of the stacks 206 or 208 to BKG interface when a flush operations is to be initiated, as will be discussed further below.

Flush operations are initiated when the IP executes a "Page Flush" or a "Cache Line Flush" instruction, both of which are included within the hardware instruction set of the instruction processor. During execution of either of these instructions, the instruction opcode enters the instruction decode logic 212 of IP 110A. Decode of the instruction causes control signals to be asserted on lines 214 to activate microsequencer 210. If BKG interface 200 is available for use, instruction decode logic 212 provides microsequencer 210 with an address as well as an indication of the type of flush request that is being initiated. The address, which is provided as an operand of the instruction, identifies the address to be flushed. For page flush instructions, the address identifies a page of memory, which in the current embodiment is 4096 bytes long. For cache line flush instructions, the address identifies a 128-byte cache line, although other cache line sizes may be used in the alternative. Upon receiving the address, microsequencer 210 provides a flush request via BKG interface 200. This request is completed by logic within SLC 108A in a manner to be discussed below.

If BKG interface is busy when a Page Flush or Cache Line Flush instruction is decoded by instruction decode logic 212, control lines 214 store the cache line or page address that is provided with the instruction into stack 206 or 208, respectively. Microsequencer 210 will initiate the flush operation when BKG interface is no longer in use. After the address is stored within the appropriate stack, instruction decode logic 212 may begin decoding the next instruction in the instruction stream. Because the IP may continue instruction execution in this manner, the IP is not stalled waiting for completion of the flush operation, as is the case in prior art systems. Moreover, the IP may continue to issue requests over primary interface 201 while flush operations and other types of background requests are completed over BKG interface 200. If the IP executes a subsequent flush instruction, the instruction is handled in the manner discussed above, and may be stored within the appropriate one of stacks 206 or 208 if BKG interface is busy. If the appropriate stack is full, the processor must wait until a stack entry is available before execution may continue with the next instruction in the instruction stream.

In some instances, several types of operations may be queued waiting for presentation to SLC 108A via BKG interface 200. For example, in addition to the flush operations, page zero operations may be scheduled for presentation to SLC 108A via the BKG interface. In this case, priority logic within microsequencer 210 determines the order in which requests are issued over the interface.

Figure 3:
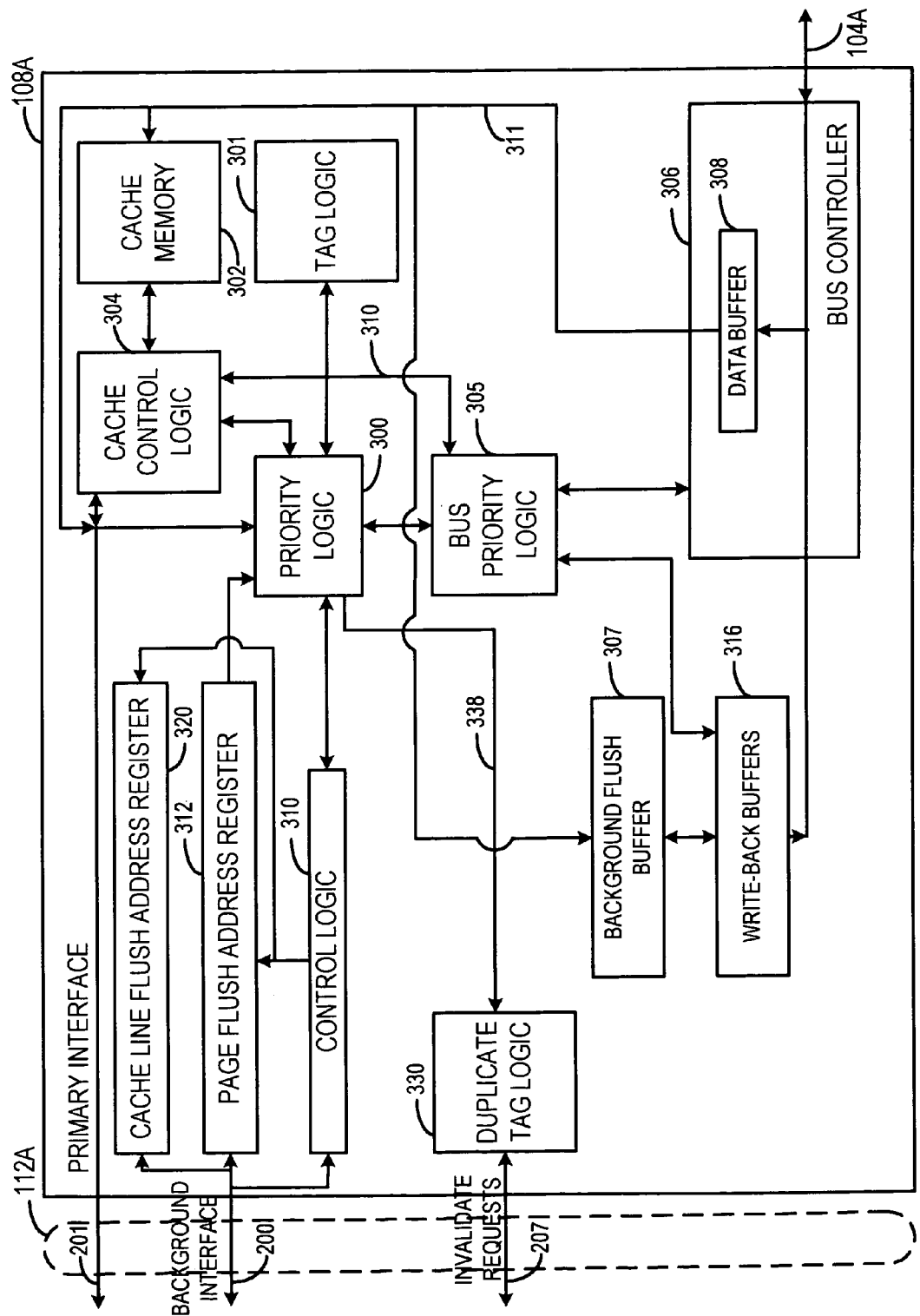
FIG. 3 is a more detailed block diagram of the Second-Level Cache of FIG. 2.

FIG. 3 is a block diagram of SLC 108A, although this illustration applies equally to each SLC 108 in the system. As discussed above, almost all read and write operations are performed over primary interface 201. This interface includes address, data, and function code signals that are provided to priority logic 300. Priority logic 300 queues and prioritizes these requests based on request type, as indicated by the function code signals.

Based on a predetermined priority scheme, a given request will be selected for processing by priority logic 300. At this time, the request address is provided to tag logic 301 to determine whether the cache line address for the request is resident within cache memory 302. At the same time, the request is forwarded by priority logic 300 to cache control logic 304. Cache control logic 304 performs a read and/or write operation to cache 302, as directed by the request function code signals. Data read from cache 302 is provided by cache control logic 304 to IP 110A via primary interface 201 if tag logic 301 determines that the cache line was resident within cache memory 302.

If a requested cache line is not resident in cache 302 as indicated by tag logic 301, the original request is passed to bus priority logic 305, which prioritizes all requests that are scheduled to be transferred to processor bus 104A. Eventually, the request will be transferred to bus controller 306 and driven onto processor bus 104A. SNC 102A receives the request so that it may be processed in the manner discussed above. Some time later, the requested cache line data will be returned over bus 104A to bus controller 306, where it is temporarily stored within data buffer 308. Bus controller 306 notifies priority logic 305 of the returned cache line. In response, bus controller schedules the transfer of the cache line to IP 110A over data path 311 and primary interface 201. Additionally, bus priority logic 305 alerts cache control logic 304 via interface 310 of the return of the cache line. This allows cache control logic 304 to schedule the replacement operation whereby the cache line is written into cache memory 302. Eventually, the replacement operation will be completed over data path 311.

As discussed above, when data is received from MSU 100 to be written to cache memory 302, some data may have to be aged from cache memory to make room for the new data. Cache control logic 304 includes logic that uses an aging algorithm to determine when cache line(s) should be aged from memory. In the current embodiment, a Least Recently Used (LRU) algorithm is employed, although any other type of mechanism may be used. When the aging mechanism determines that a particular cache line is to be flushed from memory, the cache line is stored within a flush buffer that is dedicated to storing cache lines aged from cache (not shown in FIG. 3). Eventually, bus priority logic 305 will schedule this cache line for presentation to bus controller 306, which provides the request to processor bus 104A. The cache line data will be transferred to one of several write-back buffers shown as write-back buffers 316 under the control of bus priority logic 305. This data is read from one of write-back buffers 316 by bus controller 306, which formats the data to conform to bus protocol, and drives the cache line onto processor bus 104A. SNC 102A receives the data, which is stored within TLC 106A. State bits within SNC 102A record that SLC 108A no longer retains a copy of the cache line.

The foregoing description discusses the manner in which high-priority read and write requests are handled by IP 110A and SLC 108A. These requests are initiated by IP 110A over primary interface 201. Priority logic 300 grants these requests high priority when scheduling them for presentation to tag logic 301 and cache control logic 304.

At substantially the same time as high-priority read and write requests may be occurring over primary interface 201, other requests may be issued over BKG interface 200. As discussed above, the lower-priority background requests may include, but are not limited to, page zero, page flush, and cache line flush requests. The requests are issued by microsequencer 210 which includes priority logic to determine the order in which the requests are issued over BKG interface 200. Microsequencer operates independently of instruction decode logic 212 such that IP 110A may continue instruction execution while the background tasks are issued and completed.

BKG interface 200 includes address lines, a valid indicator, a function code, and several acknowledge lines, as will be discussed further below. To initiate a page flush request, microsequencer 210 retrieves a page address from page flush stack 208 for presentation to BKG interface 200 along with a function code that indicates a page flush request is being initiated. This address is stored within page flush address register 312 as a result of microsequencer 210 asserting the valid indicator. In the current embodiment, a page address is aligned on a 4096-byte page boundary. Logic may be provided to round a page address down to the nearest page boundary if the address is not already aligned in this manner.

In a manner similar to that discussed above, during a cache line flush request, microsequencer 210 retrieves a cache line address from cache line flush stack 206. This address is presented to BKG interface 200 along with a cache line flush function code and is stored within cache line flush address register 320 when microsequencer asserts the valid indicator. A cache line address is aligned on a 128-byte boundary. Logic may be provided to round the address down to the nearest cache line boundary if the address is not already so aligned. It may be noted that a valid address may reside within cache line flush address register 320 at the same time another valid page address resides within page flush address register 312. This allows two flush requests to be pending within SLC 108A at once.

After control logic 310 receives a page flush request and/or a cache line flush request, control logic generates a request to priority logic 300. In a manner similar to that described above, priority logic 300 prioritizes the background request(s) along with all other higher-priority requests received on primary interface 201. In general, the requests received on primary interface 201 will be granted higher priority than requests associated with BKG interface 200. Requests provided on the BKG interface are executed during times when the SLC workload is not at a maximum. In one embodiment, priority logic 300 may be programmable such as via a scan interface (not shown) so that the relative priority of the various requests of the system, including those received on the BKG interface, may be modified based on system needs.

Eventually, priority logic 300 will grant a pending background request access to tag logic 301. In general, if both page and cache line flush requests are pending simultaneously, the cache line flush address will be selected for presentation to tag logic 301 before a pending page flush request is handled.

For purposes of the current example, it will be assumed that only a page flush request is pending. Therefore, the address stored within page flush address register 312 will be transferred to priority logic for presentation to tag logic 301. This address is presented to tag logic to determine whether the first cache line within the memory page is resident within cache memory. This is indicated by state bits within tag logic 301. If the first cache line in the memory page is resident in cache, it is invalidated by modifying the state bits. Additionally, if any portion of the cache line has been updated as determined by these state bits, the cache line data is copied from cache memory 302 to background flush buffer 307 over data path 311. Cache control logic further provides bus priority logic 305 with the flush address so that bus priority logic 305 may schedule the flush request.

Background flush buffer 307 is provided to temporarily store data that is being flushed from cache memory 302 because of either a page or a cache line flush request. In the current embodiment, background flush buffer 307 stores one cache line, although other buffers sizes may be used in the alternative. In another embodiment, separate cache line and page flush buffers may be provided to store data associated with cache line and page flush requests, respectively. This alternative embodiment allows both a page flush and a cache line flush operation to be queued simultaneously waiting for availability of processor bus 104A.

After the cache line has been copied into background flush buffer 307, bus priority logic 305 schedules the page flush request for presentation to bus controller 306. When the request gains priority, the address of the current cache line is passed to bus controller 306. Bus controller 306 provides a "flush cache line" command code on the function lines of processor bus 104A, and further provides the cache line address on the address lines of processor bus 104A. This request is snooped by SLCs 108A–108D, causing each SLC to search for, and invalidate, any valid copy of the flushed data that may be stored within its cache memory 302. In addition, each SLC may forward the invalidation request to its respective IP 110, if necessary, so that the IP can invalidate that cache line if it is stored within the FLC. Finally, if any SLC stores a modified copy of the cache line, that SLC will return the cache line data to SNC 102A.

The above-described bus snoop operation can be considered further by returning to the current example in reference to FIG. 3. When bus controller 306 provides the request to processor bus 104A, the request is received by the bus controller of each of SLCs 108A–108D. In particular, bus controller 306 of SLC 108A is snooping the bus, and thereby receives its own request, which is forwarded to priority logic 300. Priority logic 300 prioritizes the request and passes it to tag logic 301. Because tag logic 301 of SLC 108A has already invalidated the addressed cache line in the manner discussed above, this request does not produce any changes in the cache line state. If the flush cache line function had not been issued by SLC 108A but instead had been issued by a different SLC 108B–108D on processor bus 104A, it may be necessary for SLC 108A to invalidate the cache line in response to this request.

Priority logic 300 further forwards the cache line address on lines 328 to duplicate tag logic 330. Duplicate tag logic 330 includes a copy of the cache line addresses that are stored within FLC 203 of IP 110A. If a search of duplicate tag logic 330 indicates that the cache line is stored within FLC 203, the cache line address is transferred on lines 207 to tag logic 205 (FIG. 2.) Tag logic 205 responds to the request by invalidating the cache line so that further IP references to this cache line must be forwarded to the SLC 108A.

In addition to performing invalidation of the cache line in cache memory 302 and FLC 202, any SLC that retains a modified copy of the cache line will return that modified data to SNC 102A at this time. Only one SLC should have a modified copy of the cache line. Additionally, if such a copy exists, no other SLC should have any copy of the cache line. In the current example, SLC 108A stores a modified copy of the current cache line. When the request is snooped by SLC 108A, the data from background flush buffer 307 is copied into a selected one of several write-back buffers shown collectively as write-back buffers 316. This copy operation occurs under the control of bus priority logic 305. This data is then provided to bus controller 306. Bus controller re-drives these signals onto processor bus 104A in a manner that adheres to a predetermined bus protocol used by the processor bus. Bus controller further asserts a "Hit M" signal on processor bus 104A to indicate that modified data is being returned to SNC 102A. In one embodiment, the return of a cache line involves eight sequential bus operations, each of which transfers sixteen bytes of data to flush a total of 128 bytes of data to SNC 102A.

After SNC 102A receives modified data from SLC 108A, the cache line is invalidated within TLC 106A, and the modified data is returned by SNC 102A to MSU 100 along with a port write command. As a result, the modified data is written to MSU 100 and the state of the cache line transitions to "MSU owns" within directory 101. A similar sequence of events occurs if any other SLC on processor bus 104A returns modified data.

In another possible scenario, none of the SLCs 108A–108D stores modified data. Instead, a modified cache line copy resides within TLC 106A. In this case, the cache line is invalidated within TLC 106A. The TLC then sends a port cache line replacement command along with the modified data to MSU 100. The updated data is written to MSU 100, and the cache line state transitions to "MSU owns" within directory 101.

In yet another scenario, none of the SLCs 108A–108D or TLC 106A stores modified data for the cache line that is being flushed. In this case, SNC 102A issues a port flush command to MSU 100, but does not return data. In response to receipt of a port flush command, control logic 120 of MSU 100 issues a port flush function to all other SNCs in the system that have a valid copy of the cache line, as indicated by information stored within directory 101. This causes any modified data and ownership to be returned to MSU 100. Assume, for example, that information stored within directory 101 indicates that SNC 102B stores a copy of the flushed cache line. In response, control logic 120 issues a port snoop flush cache line command to SNC 102B. This causes SNC 102B to issue a snoop request on processor bus 104B to initiate return of the addressed cache line from all SLCs on the bus that have retained a valid copy, as is indicated by state information stored within TLC 106B. When this request is snooped by SLCs 108E–108H, each SLC will search for, and invalidate, any valid copy that is stored within its cache memory 302. In addition, the SLC may forward the request to its respective IP 110, if necessary, so that the IP can invalidate that cache line if it is stored within the FLC. Finally, if any SLC stores a modified copy of the cache line, that SLC will return the cache line to SNC 102B, and the SNC 102B forwards the data to MSU 100. In this manner, ownership for the cache line is returned to MSU 100.

While the flush operation is being completed by MSU 100 in the manner described above, another cache line flush operation could be initiated within SLC 108A. More specifically, as soon as modified cache line data is transferred from background flush buffer 307 to write-back buffers 316 and the completion of the transfer is acknowledged, the next request may be initiated. In the case wherein the cache line data was not modified such that background flush buffer 307 is not in use, the next request may be initiated after the request has been transferred to processor bus 104A, and SLC 108A snoops and processes the request. At this time, the address stored within page flush address register 312 is incremented to the start of the next cache line within the page. In the current embodiment, this involves incrementing the address by sixteen, although many other embodiments are possible. Control logic 310 then generates another request to priority logic 300 to repeat the above-described process for the next cache line. As discussed above, priority logic 300 will schedule any pending background requests for presentation to tag logic 301 along with other higher priority requests that were presented via primary interface 201. If both cache line and page flush requests are pending simultaneously, cache line flush requests are given higher priority.

In the case of a page flush request, the above-described process is continued until all cache lines in the current page have been flushed. When all cache lines have been processed for the page, control logic 310 issues a page flush acknowledge signal on BKG interface 200. Microsequencer may then provide another page flush request via interface 200 if other such requests are queued within page flush stack 208.

The foregoing description relates to the completion of a page flush operation. During that type of operation, an entire page of memory is flushed in cache line increments. As discussed above, control logic 310 increments the address stored within page flush address register 312 so that each cache line within the page is flushed, one cache line at a time.

A cache line flush operation is performed in a manner similar to that discussed above with respect to a page flush operation, except that only a single cache line is involved in the operation. As discussed above, the request is initiated by transferring a cache line address into cache line flush address register 320 via BKG interface 200. In one embodiment, the address is rounded down to the nearest cache line boundary if the address is not already so aligned. The operation then proceeds when the request is selected by priority logic 300 for presentation to tag logic. If the state of tag logic 301 indicates that modified data is resident within cache memory 302, the modified data is copied into background flush buffer 307. When bus priority logic 305 schedules the transfer operation to copy this data into one of write-back buffers 316, and after completion of this transfer operation is acknowledged, another background flush request may be initiated. At this time, control logic 310 asserts a cache line flush acknowledge signal on background interface 200. This signals microsequencer 210 that another pending cache line flush request may be retrieved from cache line flush stack 206 and provided to SLC 108A via BKG interface 200. It may be noted that the current embodiment of BKG interface 200 provides both page flush and cache line flush acknowledge signals so that both types of flush requests may be pending within SLC 108A at the same time.

The current invention provides an improved mechanism for completing page and cache line flush operations. In prior art systems, data is flushed from a cache such as SLC 108A to a higher level of the memory such as to TLC 106A as determined by a flush algorithm. There is no way to selectively flush data to main memory so that another processor may more quickly gain access to the data. The current system allows data to be flushed selectively back to memory when an IP executes a page or cache line flush instruction. These flush instructions, which are part of the hardware instruction set of the IP, each initiates a flush operation that is completed under the control of a microsequencer within the IP and associated hardware in the SLC. As a result, the IP may continue executing subsequent instructions within the instruction stream rather than stalling while waiting for completion of the flush instruction. Moreover, the flush operation of the preferred embodiment is initiated over a background interface between the IP and the associated SLC. This allows the IP to continue issuing higher-priority requests to the SLC via a primary interface while flush operations and other lower-priority background tasks are completed over the background interface.

According to one aspect of the invention, an intelligent compiler system may be used to selectively insert page and cache line flush instructions into a compiled sequence of executable machine instructions. These instructions are optimally inserted within the instruction stream to allow one or more cache lines to be flushed to main memory at a time at which that data is likely to be requested by another SNC in the system. In this manner, other SNCs may more quickly gain access to the data. This is particularly useful in an environment wherein data is being shared across multiple processors that do not all reside on the same processor bus 104.

In yet another embodiment, test-and-branch constructs may be used to avoid execution of page and cache line branch instructions in certain circumstances. Assume, for example, that a processor has completed use of an area of shared data space, and may now execute a flush instruction to selectively flush this data back to MSU 100. However, this may not always be the most efficient course of action. Assume further that the system maintains state bits stored in main memory to indicate which of the multiple processors within the system will next gain access to the shared data space. These state bits can be tested by the currently executing processor to determine whether the processor that is scheduled to access the shared data space next is located on the same processor bus 104. If so, the currently executing processor will branch around the flush instruction so that the flush operation is not executed. This increases throughput in this situation, since it is faster for the next processor to obtain the data directly from the current processor over the processor bus than to retrieve the data from MSU 100 after the flush instruction has been executed.

Figure 4:
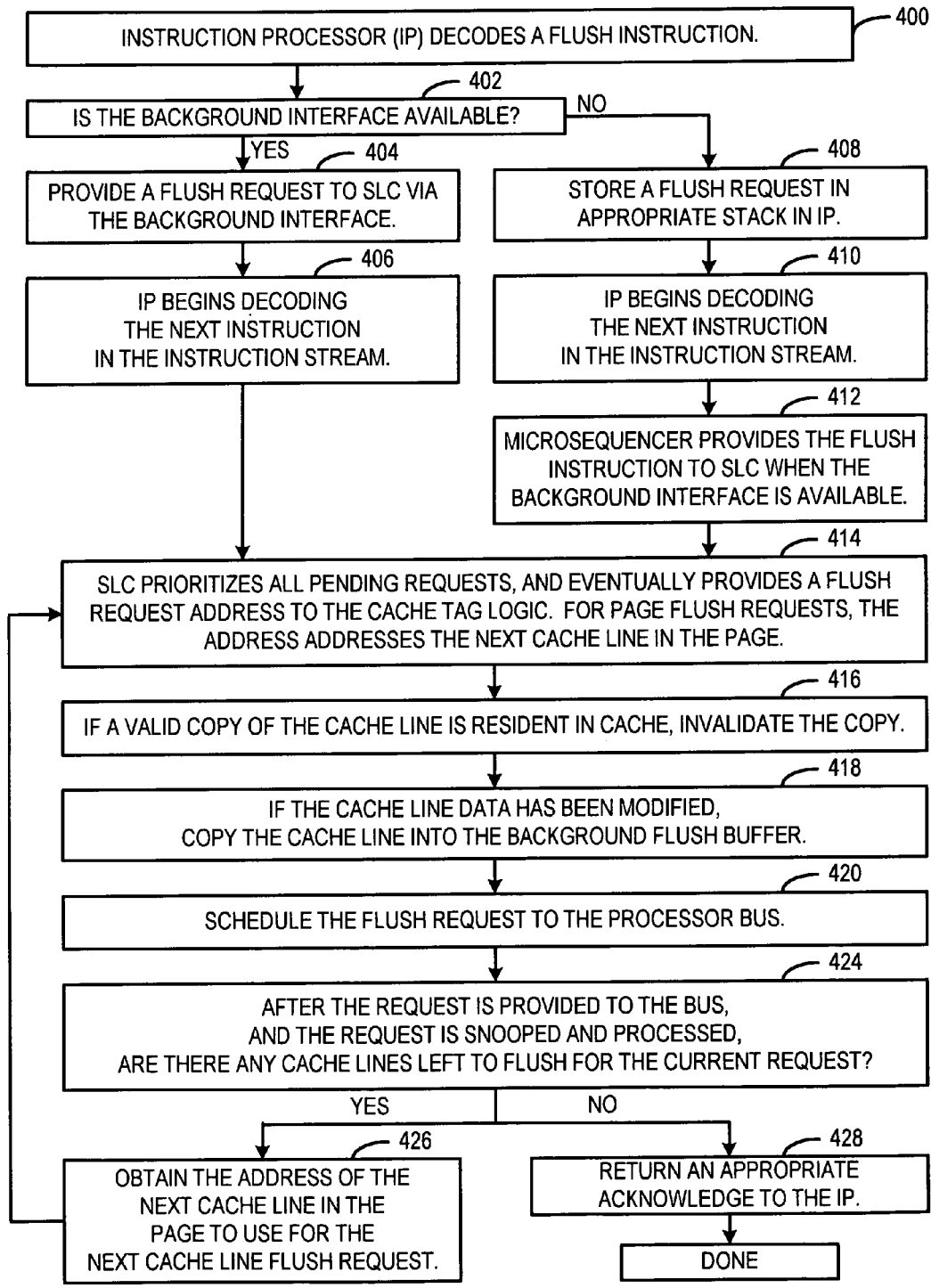
FIG. 4 is a flow diagram of one embodiment of handling one or more flush requests within an Instruction Processor and a Second-Level Cache according to the current invention.

FIG. 4 is a flow diagram of one embodiment of handling a flush request within an IP 110 and its associated SLC 108. First, the IP decodes a flush instruction (400). As a result, if background interface 200 is available (402), a flush request is provided to the SLC over the background interface (404), and the IP may begin decoding the next instruction in the instruction stream (406). Otherwise, the request is stored within the appropriate flush stack 206 or 208 within the IP (408), and the IP may begin decoding the next instruction in the instruction sequence (410). Microsequencer 210 within the IP will provide the stored page or cache line flush instruction when the background interface is available if a page or cache line flush request, respectively, is not already pending within the SLC (412).

When the SLC receives a flush request, it is prioritized along with all other pending requests, including those received over primary interface 201. Eventually, a pending flush request will be selected, and the flush address will be presented to tag logic 301 for processing (414). For a page flush request, this address will identify a cache line within the page. For the first request of the page flush operation, this address identifies the first cache line of the page. If the tag logic indicates that the addressed cache line is resident in the cache, the cache line is invalidated (416). Further, if the cache line data has been modified, the modified data is copied into the background flush buffer (418). The flush request is then scheduled for presentation to the processor bus (420).

After the flush request is provided to the processor bus, it is snooped and processed by the SLC. If modified data is associated with the request, the data must be copied from the background flush buffer to the write-back buffers. After this transfer operation is acknowledged, another flush request may be initiated within the SLC. If modified data is not associated with the current request, the snoop request processing must be completed before another flush request may be initiated. In either case, after the snoop request processing has concluded, it is determined whether another flush request must be initiated, as is the case with a page flush request that has not yet been completed (424). If so, the next cache line address in the current page is obtained (426). Processing proceeds to step 414 to continue with the next cache line in an on-going page flush operation. Otherwise, an appropriate acknowledge signal is returned to the IP (428). In one embodiment, separate cache line flush and page flush acknowledge signals are provided on background interface 200 to indicate the type of request just processed. This allows both types of requests to be pending simultaneously within the SLC.

Figure 5:
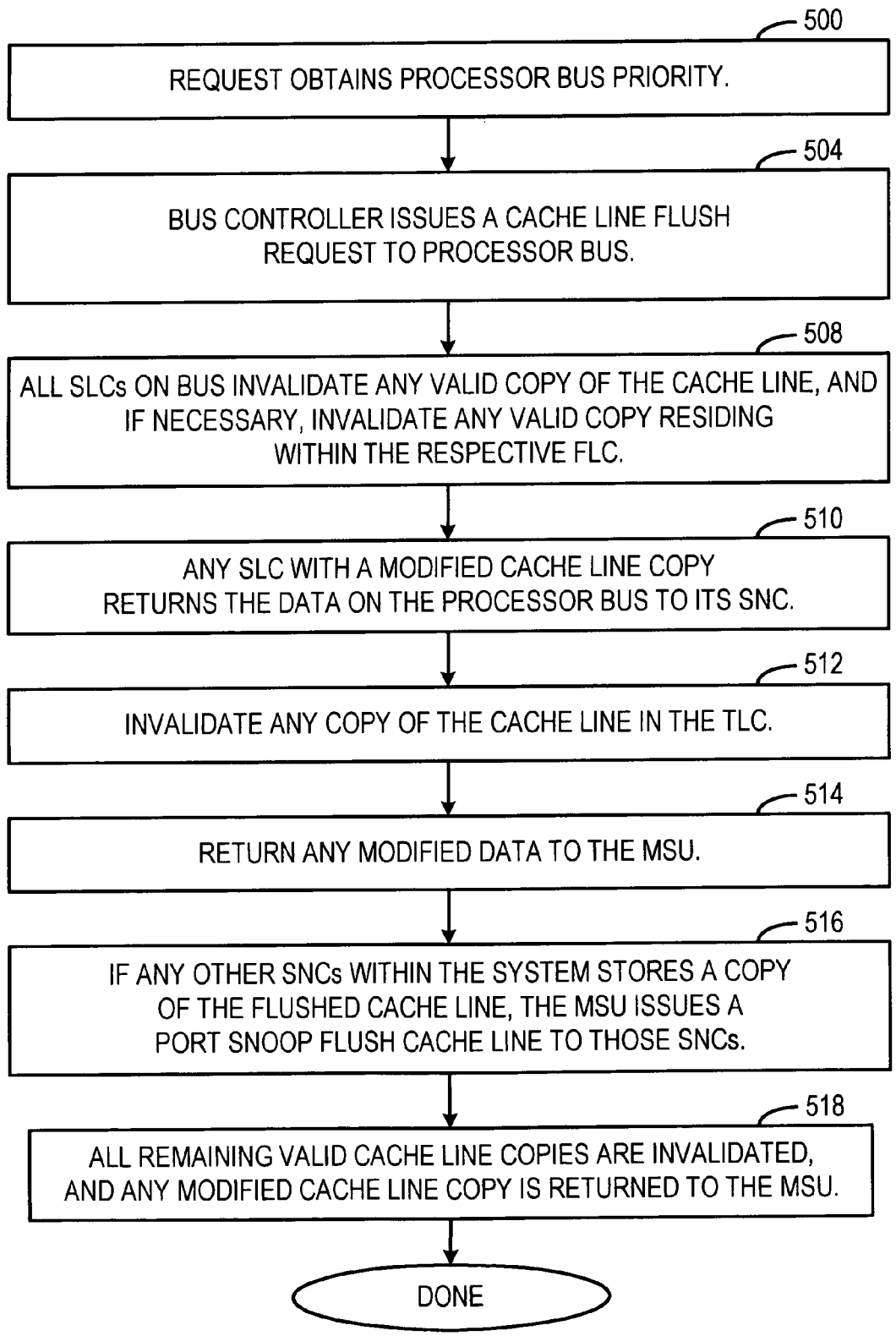
FIG. 5 is a flow diagram illustrating one embodiment of handling a flush request after the request is scheduled for presentation to the processor bus.

FIG. 5 is a flow diagram illustrating one embodiment of handling flush requests after the requests are scheduled for presentation to a processor bus 104. First, a request is granted priority by bus priority logic 305 (500) of an SLC. The bus controller 306 issues a cache line flush request to processor bus (504). When the SLCs on the bus snoop the request, all SLCs invalidate any valid copy of the cache line, and if necessary, pass the cache line address to the respective IP so that the IP may invalidate the cache line within the FLC 202 (508). Any SLC having modified cache line data returns the modified copy to its SNC (510). In a case wherein the SLC initiating the request stores modified data, this data is copied from the background flush buffer to the write-back buffers so that the data may be provided to the processor bus. Otherwise, this data is copied from the cache memory to the write-back buffers, and is then provided to the processor bus.

Next, the SNC invalidates any copy of the cache line within its TLC (512). Any modified data is returned to MSU 100 (514). In some cases, this returned data is obtained from an SLC 108, and in other cases, the latest data copy is obtained from TLC 106A. If modified data is returned, it is stored within MSU 100, and the state of the cache line is set to "MSU owns". If one or more other SNCs 102 stores a copy of the cache line, MSU issues a port snoop flush cache line command to these SNC(s) (516). This causes these SNC(s) to each issue snoop requests to all of their respective SLCs to cause invalidation of the cache line, and to return any modified data in a manner similar to that discussed above (518). When the operation is completed, the cache line state will be set to "MSU owns".

It will be appreciated that many alternative embodiments of the foregoing system and method are possible within the scope of the current invention. For example, a data processing system employing the current invention may include more or fewer SNCs, SLCs, and/or IPs. Alternatively, the system may employ an entirely different system architecture or utilize another coherency scheme while still usefully employing the current invention to be described in detail below. If desired, a flush instruction could be contemplated that flushes a byte, word, or some other portion of the memory. In another embodiment, the flush operation could operate to flush the data only to a TLC 106, rather than to MSU 100. Thus, the embodiments presented herein are to be considered exemplary only, and the scope of the invention is indicated only by the claims that follow rather than by the foregoing description.

What is claimed is:

1. For use in a data processing system having at least one Instruction Processor (IP) coupled to a cache memory, a system comprising:

a primary interface coupling the IP to the cache memory to provide read and write requests from the IP to the cache memory; and a background interface coupling the IP to the cache memory to selectively initiate the flushing of data from the cache memory.

2. The system of claim 1, wherein the IP includes decode logic coupled to the background interface to decode a flush instruction and to initiate the sending of a flush request over the background interface.

3. The system of claim 2, wherein the decode logic decodes flush instructions selected from the group consisting of a page flush instruction and a cache line flush instruction.

4. The system of claim 2, wherein the IP includes a circuit coupled to the background interface to provide the flush request to the background interface.

5. The system of claim 4, wherein the circuit is a microsequencer.

6. The system of claim 4, wherein the circuit operates independently of the decode logic to provide the flush request to the background Interface.

7. The system of claim 4, and further including a storage device coupled to the decode logic to store the flush request if the background interface is busy.

8. The system of claim 1, wherein the read and write requests may be provided to the cache memory over the primary interface simultaneously with the initiation of the flushing of data over the background interface.

9. The system of claim 1, wherein the IP issues a flush request to initiate the flushing of data, and wherein the cache memory includes a circuit coupled to the background interface to receive the flush request.

10. The system of claim 9, wherein the circuit includes a storage device to store the received flush request.

11. The system of claim 10, wherein the storage device is capable of storing multiple pending flush requests.

12. The system of claim 11, wherein each of the multiple pending flush requests are selected from the group consisting of a page flush request to flush a page and a cache line flush request to flush a cache line.

13. The system of claim 12, wherein the storage device is capable of simultaneously storing a pending page flush request and a pending cache line flush request.

14. The system of claim 13, wherein the circuit includes tag logic to invalidate any copy of the data residing within the cache memory.

15. The system of claim 14, wherein the circuit includes priority logic to schedule the flush, read, and write requests for presentation to the tag logic.

16. The system of claim 15, wherein the flush requests are granted lower priority than the read and write requests.

17. The system of claim 13, wherein the circuit is coupled to a main memory, and wherein the circuit includes a bus controller to transfer the flush request to the main memory.

18. The system of claim 17, wherein the bus controller includes circuits to transfer the data to the main memory if the data has been modified.

19. The system of claim 17, and further including a storage node controller to couple the circuit to the main memory and to transfer the flush request to the main memory.

20. The system of claim 17, wherein the cache memory is coupled to provide the flush request to at least one other cache memory, whereby the at least one other cache memory invalidates all valid stored copies of the data and transfers any updated copies of the data to the main memory.

21. The system of claim 15, wherein the circuit is coupled to a main memory, and wherein in response to a page request, the circuit flushes a page of data to the main memory using multiple transfer operations.

22. The system of claim 21, wherein each of the multiple transfer operations transfers a cache line of data.

23. The system of claim 22, wherein each cache line of data within the page is scheduled as a separate request by the priority logic.

24. For use in a system having an Instruction Processor (IP) coupled to a cache memory via a primary interface for issuing read and write requests, and a background interface for issuing background requests, a method of selectively flushing data from the cache memory to a main memory, comprising:
 a.) executing, by the IP, a flush instruction that specifies an address within the main memory; and
 b.) in response to execution of the flush instruction, issuing via the background interface a flush request to the cache memory to cause data identified by the address to be flushed from cache memory to the main memory.

25. The method of claim 24, wherein the flush instruction is included in the machine instruction set of the IP.

26. The method of claim 25, wherein the flush instruction is selected from the group of instructions consisting of a page flush instruction and a cache line flush instruction.

27. The method of claim 24, wherein the data is flushed from cache memory in predetermined portions.

28. The method of claim 27, wherein each of the predetermined portions is a cache line.

29. The method of claim 24, wherein step b.) includes invalidating the data within the cache memory.

30. The method of claim 29, wherein step b.) includes writing any modified portion of the data back to the main memory.

31. The method of claim 30, wherein step b.) includes writing the modified portion of the data back to the main memory in cache line portions.

32. The method of claim 31, wherein the cache memory is coupled to at least one other cache memory, and wherein step b.) includes initiating a snoop request to cause the at least one other cache memory to flush the data back to the main memory.

33. The method of claim 32, and further including invalidating, within the at least one other cache memory, any stored copies of the data.

34. The method of claim 33, wherein a storage node controller is coupled to the cache memory, and further including invalidating a copy of the data stored by the storage node controller.

35. The method of claim 30, wherein step b.) includes returning ownership of the data to the main memory.

36. The method of claim 35, and wherein the main memory is coupled to multiple cache memories, and wherein step b.) includes causing the main memory to issue a command to all of the multiple cache memories that stores a valid copy of the data to cause all valid copies of the data to be invalidated.

37. The method of claim 36, and further including returning any modified copy of the data stored by any of the multiple cache memories to the main memory.

38. A system including a cache memory coupled to an instruction processor (IP) and a main memory, the system to flush data from the cache memory to the main memory, comprising:
 a decode circuit included within the IP to decode a flush instruction, the flush instruction identifying data that may be stored within the cache memory; and
 a circuit including a background interface to provide a flush request from the IP to the cache memory and to thereby flush the data from the cache memory.

39. The system of claim 38, and further including a primary interface coupling the IP to the cache memory to provide read and write requests from the IP to the cache memory, and whereby a read or write request may be issued to the cache memory simultaneously with the flush request.

40. The system of claim 38, wherein the decode circuit is adapted to decode flush instructions that are selected from the group consisting of page flush instructions to flush a page of data, and cache line flush instructions to flush a cache line of data.

41. The system of claim 38, wherein the circuit includes logic to flush the data from the cache memory a cache line at a time.

42. A system to flush data from a cache memory to a main memory, comprising:
 a decode circuit to decode a flush instruction, the flush instruction identifying data that may be stored within the cache memory; and
 a microsequencer responsively coupled to the decode circuit, the microsequencer to initiate flushing of the data from the cache memory independently of the decode circuit, whereby the decode circuit is executing an instruction different from the flush instruction while the microsequencer initiates flushing of the data.

43. For use in a multiprocessor data processing system having a main memory coupled to multiple cache memories, wherein at least one of the cache memories is coupled to an instruction processor via a background interface for flushing data, and a primary interface for issuing read and write requests, a system for flushing data to the main memory, comprising:
 a decode circuit included within the instruction processor to execute a flush instruction that identifies addressable data stored within the main memory; and
 a circuit coupled to the decode circuit via the background interface, the circuit to cause all valid copies of the data that may be stored within the multiple cache memories to be flushed to the main memory.

44. The system of claim 43, wherein the circuit includes logic to return any updated copy of the data to the main memory.

45. The system of claim 44, wherein the circuit includes logic to invalidate all of the valid copies of the data that may be stored within the multiple cache memories.

46. A system to flush data from a cache memory to a main memory, comprising:
 processor means for executing a flush instruction that includes a selected address;
 background Interface means for flushing any valid copy of data associated with the address from the cache memory in response to execution of the flush instruction by the processor means; and
 primary interface means for Providing requests from the processor means to the cache memory while flushing of any valid copy of the data occurs via the background interface.

* * * * *